United States Patent [19]

McAllister

[11] Patent Number: 4,646,934

[45] Date of Patent: Mar. 3, 1987

[54] VACUUM INSULATED SHIPPING CONTAINER AND METHOD

[76] Inventor: Ian R. McAllister, 3578 Quesnel Drive, Vancouver, BC, Canada, V6L 2W6

[21] Appl. No.: 821,381

[22] Filed: Jan. 21, 1986

[51] Int. Cl.$^4$ ............................................. B65D 25/04
[52] U.S. Cl. ..................................... 220/420; 220/83; 220/468; 206/524.8
[58] Field of Search ................ 220/420, 425, 468, 1.5, 220/83, 84, 5 A; 206/524.8; 150/52 F

[56] References Cited

U.S. PATENT DOCUMENTS

| | | |
|---|---|---|
| 1,337,278 | 4/1920 | Schulz . |
| 2,260,393 | 10/1941 | McCarthy ........................ 220/468 X |
| 2,633,264 | 4/1951 | Dinsmore et al. . |
| 3,064,770 | 11/1962 | Andrews ......................... 220/5 A X |
| 3,370,740 | 2/1968 | Anderson . |
| 3,395,824 | 8/1968 | Gerhard ............................... 220/5 A |
| 4,050,605 | 9/1977 | Wakana et al. ................... 220/83 X |
| 4,193,510 | 3/1980 | Weston .............................. 220/83 X |
| 4,343,413 | 8/1982 | Chatzipetros et al. . |

Primary Examiner—Steven M. Pollard
Attorney, Agent, or Firm—Hughes & Cassidy

[57] ABSTRACT

An insulated vacuum container comprising inner and outer wall sections, with each wall section made up of a skeletal frame, with membranes enclosing each frame. The membranes of the outer wall section curve inwardly, while the membranes of the inner section curve outwardly. The pressure loads imparted on the membranes are reacted substantially entirely in tension into the skeletal frames.

24 Claims, 12 Drawing Figures

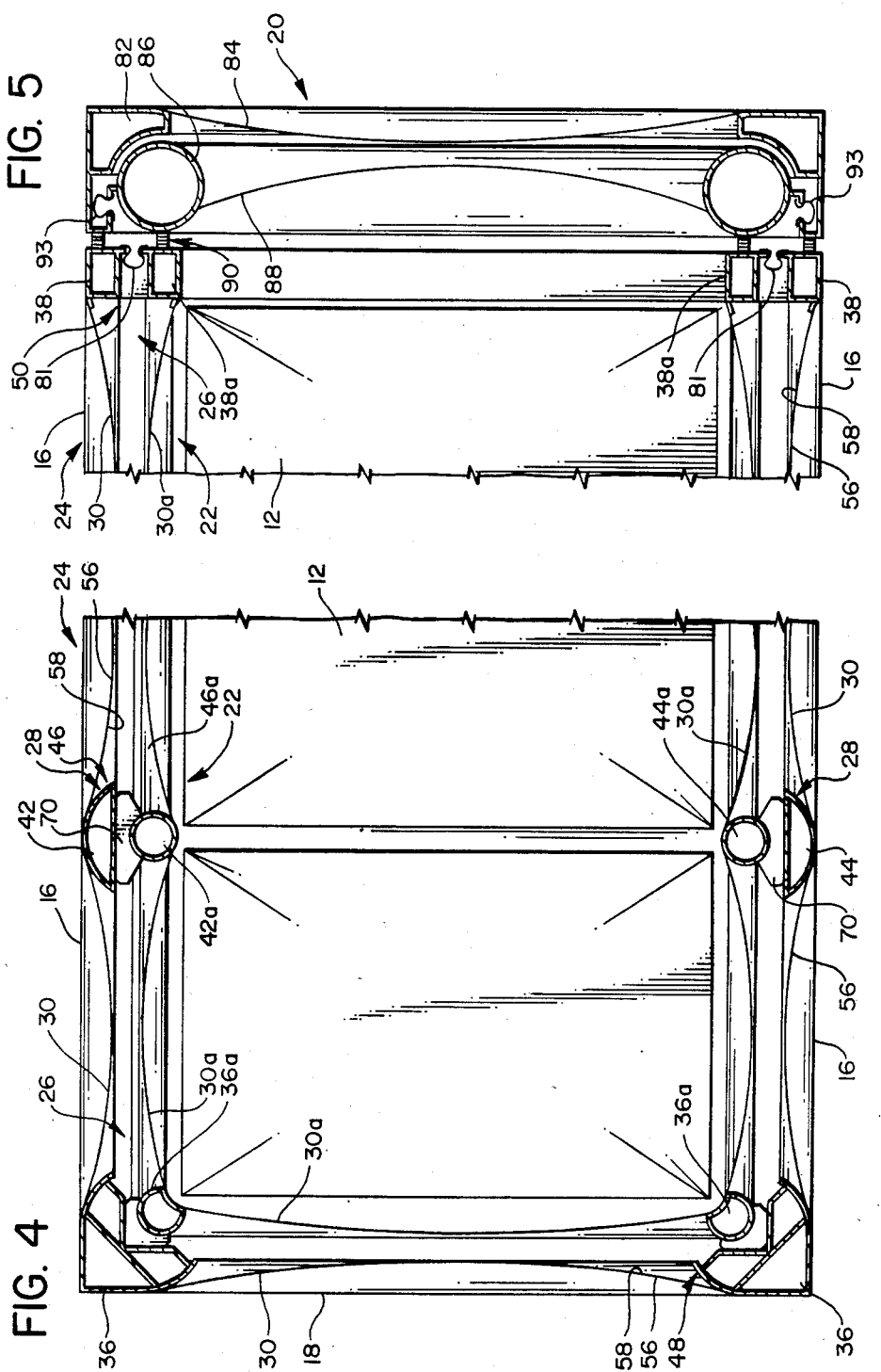

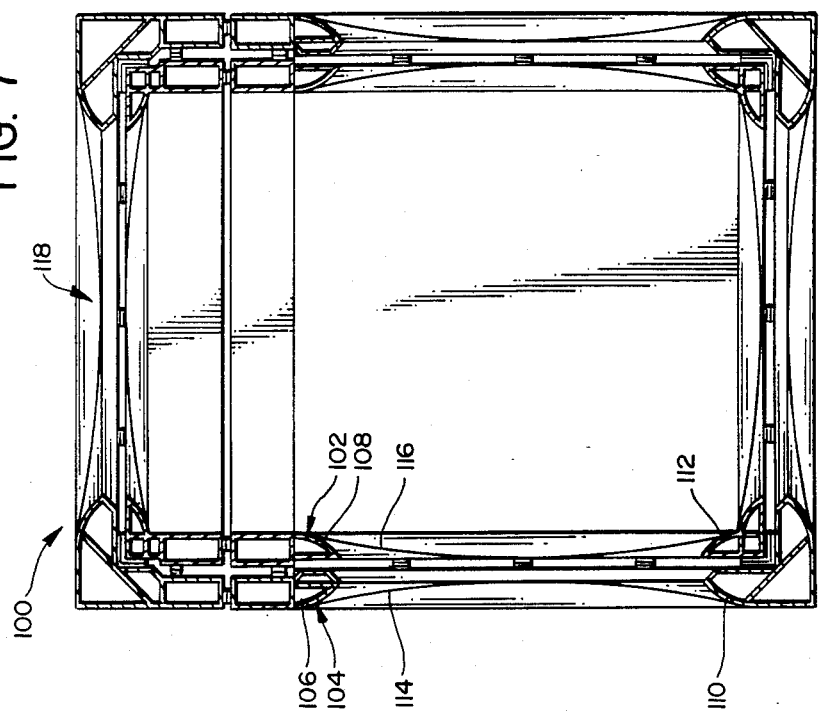
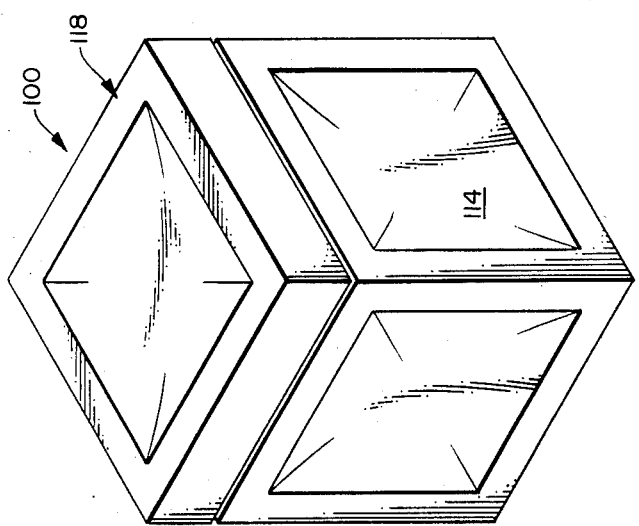

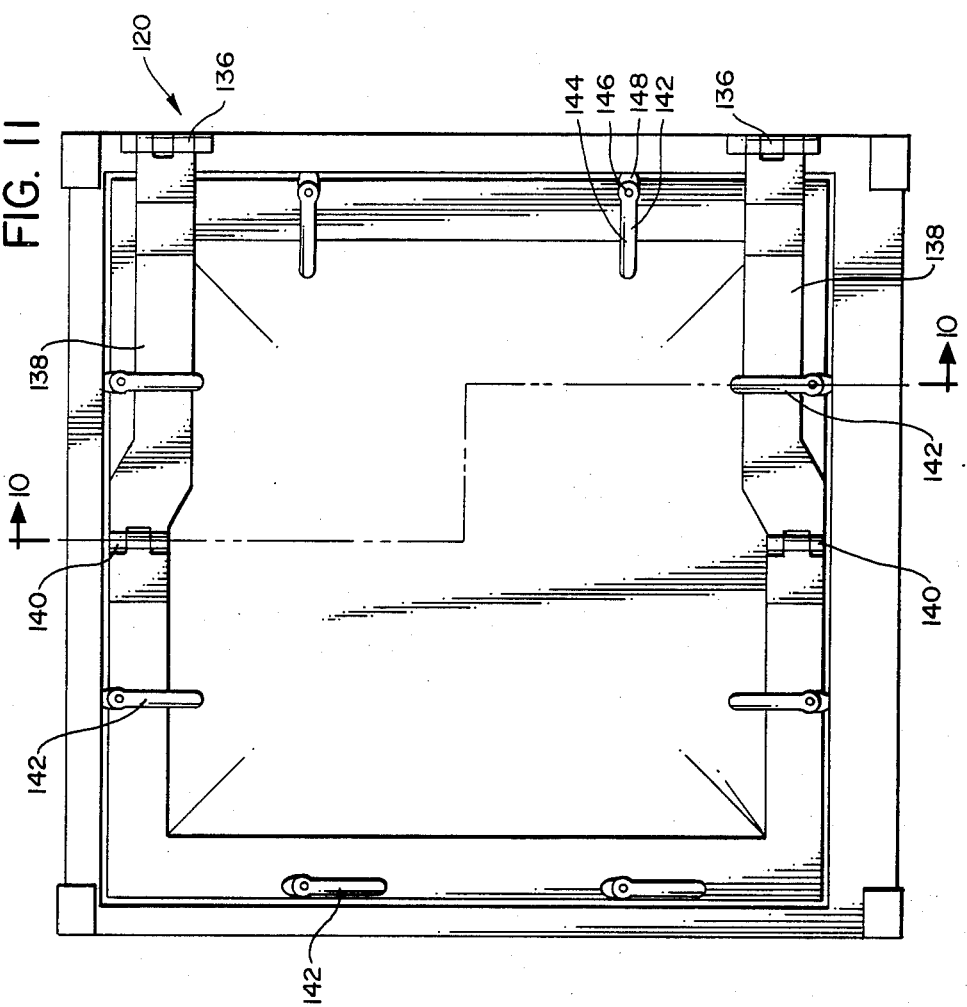
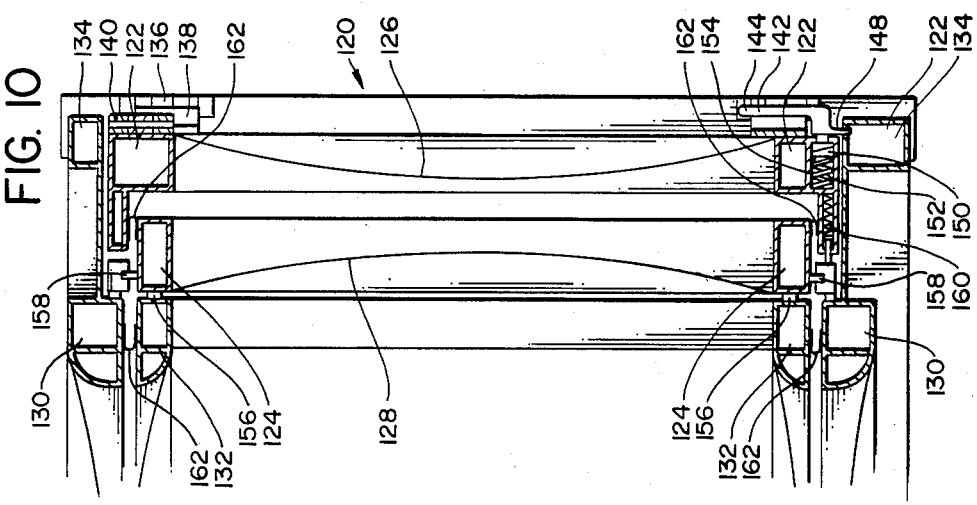

VACUUM INSULATED SHIPPING CONTAINER AND METHOD

BACKGROUND OF THE INVENTION

1. Field of the Invention

The present invention relates to vacuum insulated containers, and more particularly to such containers adapted for use in shipping products, such as products which must be kept at very low temperatures for relatively long periods of time.

2. Background Art

One of the common uses of insulated cargo containers is for the shipment of frozen food stuff. Such containers can be designed to produce temperatures below 0° F. However, with age, quite commonly deterioration of the insulation and also of the refrigeration equipment occurs, this resulting in reduction of the subzero capabilities of such containers. Even though the operators who use such insulated cargo containers attempt to maintain a high quality of service, the cost of doing so has been continuously increasing over the years. Further, in many instances, maintaining the temperature of food stuffs at approximately 0° F. is not optimum for food quality maintenance.

It has been known for years that the fast freezing of food stuffs, such as fruits, vegetables, fish and other commodities, using cryogenic fluids such as liquid nitrogen can result in a superior market product. While these techniques have been used and automated equipment has been developed to perform the freezing operation, the problem of shipping at quite low temperatures (i.e. near $-80°$ F.) has been a very difficult one to solve. Thus, though the near 0° F. shipping temperatures are not optimum for food quality maintenance, for the large part, shipping containers having the capability to be used only for shipment at temperatures at about 0° F. are the current state of the art.

It has long been known that excellent insulating capability can be obtained by providing a vacuum between two members, a common device utilizing this principle being the vacuum flask. Such a flask is made up of inner and outer walls which are spaced from one another, with a vacuum being provided in the space between the two walls. Quite commonly the two walls are formed as concentric cylindrical side wall sections, with the ends of the cylinders being closed by concentric hemispherical sections. An opening is provided through one of the end hemispherical sections.

However, the walls of the vacuum flask are subjected to rather substantial forces. With atmospheric pressure being approximately 15 pounds per square inch (psi) at sea level, the outside wall of a 3 inch diameter by 12 inch long standard vacuum bottle is subjected to a total lateral force of as much as 540 pounds. The internal wall of the flask does not require as heavy a wall, since the internal forces are directed radially outwardly, so that the material forming the inner wall is in tension, with there being no buckling tendency. However, the outer wall experiences what can be described as a crushing force, and the outer wall must be structurally stronger to withstand the forces which would tend to buckle the outer wall.

Because of the structural problems of providing a vacuum insulating container, in many instances the thought of using the evacuated area as insulation is abandoned, and thick high quality insulation is used. However, to maintain quite low temperatures for long periods of time, even the use of quite thick, high quality insulation is not satisfactory.

Another consideration is that in any shipping container, the volume occupied by the container is an important consideration. Desirably, the total volume occupied by the container should not be too much greater than the volume of the product contained. Further, it is desirable that the configuration of the shipping container be such so that the loading of the containers into, for example, a truck or a freight car, can be accomplished as economically as possible, with the optimum use of space.

A search of the patent literature has disclosed a number of patents, these being the following.

U.S. Pat. No. 4,343,413—Chatziptros et al shows a double walled container with both of the walls being cylindrical. Spacing elements are placed between the two wall sections.

U.S. Pat. No. 3,370,470—Anderson discloses what is called a "vacuum jacketed joint construction". This shows an arangement of reinforcing members which are placed in a manner to maintain separation of the walls by resisting the pressure forces on the walls. Essentially, there are post-like members extending perpendicular to the walls, and tension cables extend over these post-like members. These tension members or cables resist the buckling of the walls.

U.S. Pat. No. 2,633,264—Dinsmore et al shows a double wall container having a box-like configuration. It is stated that, "the space between the outer shell and the inner shell 16 may be evacuated, or it may be left as a dead air space, or it may be filled with insulating material".

U.S. Pat. No. 1,337,278—Schulz shows a vacuum container having a generally cylindrical configuration, with spacers being provided between inner and outer walls of the container.

SUMMARY OF THE INVENTION

The vacuum insulated container of the present invention comprises a fluid tight outer containing structure having first wall means adapted to be exposed to ambient pressure, and also a fluid tight inner containing structure defining a product containing area and having a second inner wall means spaced inwardly from the first wall means. The first and second wall means define therebetween a substantially evacuated insulating area to insulate the containing area from ambient heat transfer.

The outer containing structure comprises a plurality of wall sections. Each of the wall sections comprises a perimeter frame defining a wall section area. There is a generally planar membrane section extending across the wall section area and having a main central portion and a perimeter portion attached to the perimeter frame. The main central portion of the membrane section has a configuration, relative to the perimeter frame, of an inwardly curved plane, such that ambient pressure acting against an outer surface of the membrane section causes the membrane section to react substantially entirely in tension to withstand the ambient pressure.

In a preferred configuration, the outer containing structure comprises at least four longitudinally extending corner beams, each of which is connected to at least two related membrane sections. Each membrane section has a related locating plane coincident with the perimeter portion of the membrane section. The locating planes of the two related membrane sections that join to their related beam form an angle of less than 180°, whereby the two related membrane sections, each acting in tension relative to their related beam, exert a resultant force on their related beam inwardly along a force component line being directed inwardly between the two locating planes.

Each related pair of corner beams is connected to one another by cross beams, extending generally transversely between the related pair of corner beams. Each of the corner beams reacts to resist compression loads extending between its related pair of corner beams. Each adjacent pair of cross beams forms with related portions of their related corner beams a related one of the perimeter frames.

In the preferred form, the inner containing structure is constructed similarly to the outer containing structure and comprises a plurality of second wall sections. Each of the second wall sections comprises a second perimeter frame defining a section wall section area. As with the outer containing structure, there is a generally planar second membrane section which joins to its related perimeter frame. This second membrane section curves outwardly in a manner that pressure within the container acting against an inner surface of the membrane section causes the membrane section to react substantially entirely in tension to withstand the pressure inside the container.

In the preferred form, the vacuum container has the overall configuration of a rectangular prism, with the first corner beams comprising at least two upper corner beams and two first lower corner beams. The second corner beams comprise at least two second upper corner beams and two second lower corner beams. The second corner beams are spaced inwardly of the first corner beams.

In the preferred form, there is frame interconnecting means to interconnect the first and second frames so as to maintain the first and second frames spaced from one another. Desirably, the interconnecting means are positioned, at least partially, between adjacent pairs of first and second cross beams, in a manner that tension loads imparted by the membrane sections acting on the cross beams is reacted in compression between the interconnecting means.

In addition, the present invention comprises an insulating structure, having first and second perimeter frames, and tension membranes extending across each of said perimeter frames.

Also, the invention comprises a cover member, enclosing an open end portion of said container. Said cover member comprises first and second perimeter seal means, with said first seal means being urged by spring means into sealing contact with an edge portion of the inner wall structure of the container.

Each of the membrane sections has a width dimension, and also a deflection distance which is that distance between the locating plane and a maximum point of deflection of the main central portion of the membrane section. The membrane section has a deflection over width value which is equal to the deflection dimension divided by the width. In the preferred form, the deflection over width value is at least as great as 0.02, and desirably at least as great as about 0.4. Also, the deflection over width value should be no greater than about 0.1, and desirably no greater than about 0.7.

Other features of the present invention will become apparent from the following detailed description.

BRIEF DESCRIPTION OF THE DRAWING

FIG. 4 is a sectional view taken along line 4—4 of FIG. 1;

FIG. 5 is a sectional view taken along line 5—5 of FIG. 1, and illustrating the configuration of the end cover;

FIG. 6 is an isometric view of a second embodiment of the present invention;

FIG. 7 is a sectional view taken along a plane coinciding with the vertical center line of the container of FIG. 6;

FIG. 10 is an end view of a cover of a second embodiment of the second embodiment, used to close the container of the present invention; and FIG. 11 is a sectional view taken along line 11—11 of FIG. 10.

DESCRIPTION OF THE PREFERRED EMBODIMENTS

Figure 1:
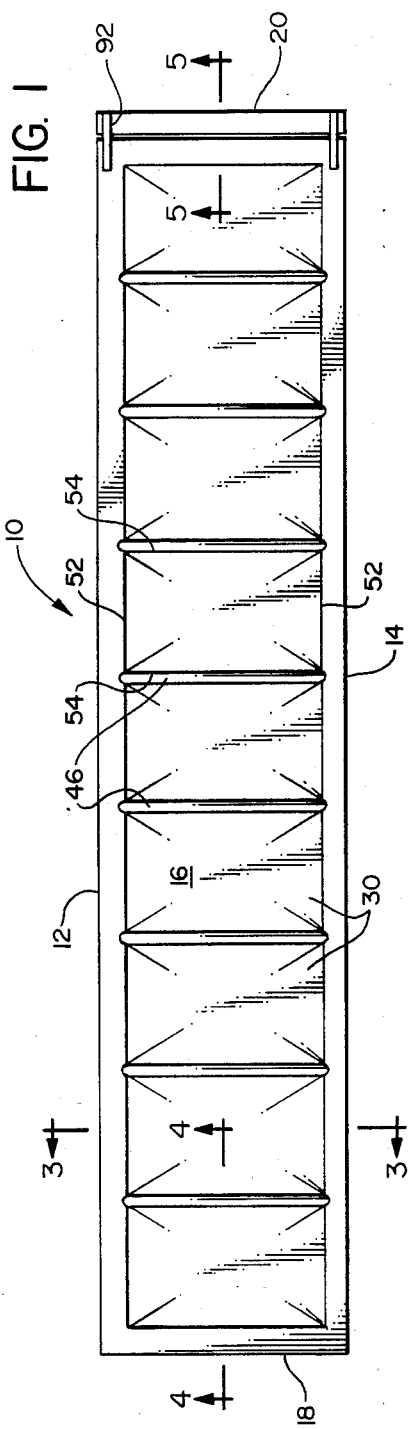
FIG. 1 is a side elevational view of a container embodying teachings of the present invention.
Figure 2:
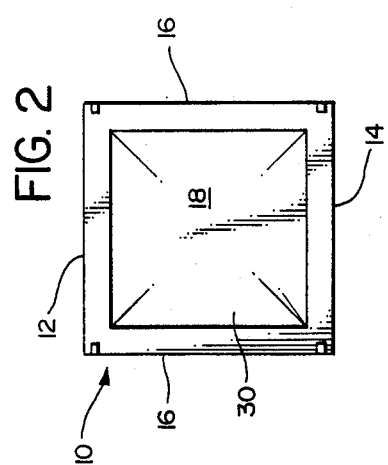
FIG. 2 is an end view of the container of FIG. 1, looking at an end closure drawer of the container.

A first embodiment of the present invention is illustrated in FIGS. 1-5, which show a container 10 shaped as a rectangular prism having a square cross-sectional area. In terms of configuration, the container 10 comprises a top wall 12, a bottom wall 14, two side walls 16, an end wall 18, and a removable end cover 20 positioned at an end of the container 10 opposite to the location of the end wall 18. The end of the container 10 adjacent the cover 20 shall be considered the forward end of the container 10, while the location proximate to the end wall 18 will be considered the rear of the container 10.

In terms of structure, the container 10 can be considered as having an inner structure 22 and an outer structure 24 substantially surrounding the inner structure 22 and spaced a short distance outwardly therefrom so as to define with the inner structure 22 an evacuated insulating area, generally designated 26.

The outer structure 24 comprises a skeletal frame 28 which is covered by a plurality of sheet sections or membrane sections 30. In the particular configuration shown herein, the frame 28 comprises two upper longitudinal beams 32, located at the juncture lines of the side walls 16 and the top wall 12 and two lower longitudinal beams 34 located at the juncture lines of the two side walls 16 with the bottom wall 14. In addition, there are four end beams 36 located at the edges of the end wall 18, and a second set of end beams 38 interconnected in a square configuration at the location of the cover 20, so that two of these second end beams 38 are positioned at the front edges of the side walls 16, while the other two second end beams 38 are positioned at the front edges of the top wall 12 and bottom wall 14, respectively.

Extending between each upper longitudinal beam 32 and a related lower longitudinal beam 34 positioned immediately below, there are a plurality of evenly spaced vertical intermediate beams 40. In like manner, there are a plurality of upper intermediate beams 42 extending horizontally between the two upper beams 32, and a plurality of lower intermediate beams 44 extending horizontally between the two lower longitudinal beams 34.

Thus, it can be seen that the beams 32-44 collectively define a plurality of interconnected rectangular frame sections. For example, a pair of adjacent vertical intermediate beams 40 form with those portions of the upper and lower longitudinal beams 32 and 34 that extend therebetween a rectangular frame section. Likewise, the first end beams 36 collectively form a square frame section, as do the second end beams 38. The frame sections which are formed by each adjacent pair of intermediate beams 40, 42 or 44 shall be termed an intermediate section and be designated 46. The frame section formed by the first end beams 36 shall be designated a first end section 48, while the section formed by the second set of end beams 38 shall be designated a second end section 50.

Each of the frame sections 46 and 48 has a related membrane section 30 having two edges 52 which join to the longitudinal beams 32 and/or 34, and two second edges 54 which join to the intermediate beams 46. The membrane sections 30 are made fluid tight so as to be impervious to the passage of air, and the membrane edges 52 and 54 are joined to their respective beam members to make a fluid tight connection.

As indicated earlier, the area 26 between the outer and inner structures 22 and 24 is evacuated. With the outer surface 56 of each of the membrane sections 30 being exposed to ambient atmosphere, and with the inside surface 58 of each membrane 30 facing a vacuum, it is readily apparent that atmospheric pressure acting upon the membrane 30 creates a substantial force tending to push the membrane inwardly toward the interior of the container 10. As will be discussed more fully hereinafter, each of the membranes 30 is arranged so that these rather substantial force loads are reacted substantially entirely in tension along lines of force parallel to the curved plane of the membrane 30. This causes the outer surface 56 of each membrane 30 to assume a moderately concave curvature.

Each membrane 30 can, for purposes of description, be considered as having a locating plane which is coincident with the perimeter of the membrane (i.e. the edges 52 and 54) where the membrane 30 or 30a joins to its related perimeter frame. Then the membrane can be considered as actually being positioned in a curved plane which meets the locating plane at the edge locations 52 and 54, but which curves away from the locating plane.

Figure 1A:
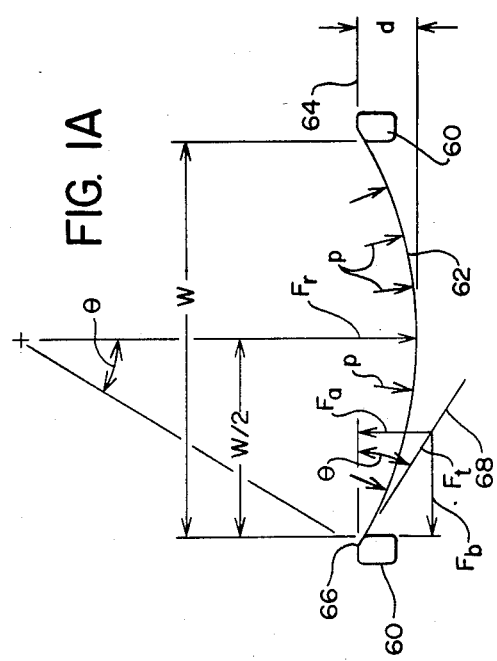
FIG. 1A is a schematic drawing illustrating the manner in which pressure forces are reacted into the membrane section and frame portion of the container of the present invention.

It is believed that a better understanding of the description which is to follow will be achieved by at this time providing a simple analysis of the nature and effort of the tension loads exerted on each membrane 30, and reference is now made to FIG. 1A, which is a rather simplified diagram showing two beams 60 of theoretically infinite length, with a membrane 62 extending between the two beams 60, with this membrane 62 also being of infinite length. In this example, we shall assume that the beams 60 will not deflect under loading, and that the membrane 62 does not elongate under tension loads.

In this example, the width dimension of the membrane (i.e. the distance between the two beams 60) is designated "W". The atmospheric pressure exerted against the outer surface of the membrane 62 is indicated by a multiplicity of small arrows "p", and the resultant force of this pressure is indicated at "Fr". It is assumed that the membrane 62 is constructed, relative to the spacing of the beams 60, so that the middle portion of the membrane 62 will deflect a distance "d" from the plane extending between the beams 60 at the juncture point of the membrane 62.

This force Fr is reacted totally in tension in the membrane 62. To calculate the tension force exerted on the membrane 62, a line is drawn tangent to the membrane 62 at the juncture point 66 where the membrane 62 joins to the beam 60, this tangent line being designated 68. The angle being made by the line 68 with the line or plane 64 is designated by $\phi$, and the tension force at the point of tangency 66 is designated "Ft". The force Ft can be divided into two force components, namely "Fa", directed oppositely to the force Fr, and a second force component designated "Fb", extending perpendicular to the force component Fa. It can readily be appreciated that as the angle $\phi$ decreases, the resultant tension force Ft on the membrane 62 will increase. As an example, let it be assumed that the angle $\phi$ was 10°. The tension force Ft would be equal to Fa (which would be equal to Fr times cosecant of $\phi$). With the cosecant of 10° being approximately 5.7, the tension force Ft would be 5.7 times the resultant force Fr.

Another consideration is the amount of deflection which the membrane undergoes. For a given width w, the amount of deflection d can be calculated according to the following formula:

$$d = w/2(\csc \phi - \cot \phi)$$

For an angle $\phi$ of 10°, this deflection d will be about 0.09 w.

For relatively small angles of $\phi$ (i.e. 10° or less), the tension force exerted on the membrane 62 would be nearly directly inversely proportional to the magnitude of the angle $\phi$. On the other hand, the deflection d of the membrane 62 would be substantially directly proportional to the angle $\phi$. It is, of course, desirable to keep the amount of deflection d as small as possible to keep the containing volume of the container 10 as great as possible relative to the total volume occupied by the container 10. On the other hand, there is a practical lower limit to which the deflection d can be lowered, before the stress on the membrane 62 and the beams 60 becomes so excessive that the bulk and weight of the beams 60 and membranes 62 are unrealistically high.

With the foregoing in mind, we will now continue with a description of the structure of the container 10. The skeletal frame of the inner structure corresponds almost exactly to that of the outer structure. Accordingly, for ease of description, the beams of the inner structure which correspond to beams of the outer structure will be given like numerical designations, with an "a" suffix distinguishing the beams of the inner structure 24. Thus, the inner structure 24 has a skeletal frame 28a made up of the upper and lower longitudinal beams 32a and 34a, beams 36a and 38a, and also intermediate beams 40a-44a.

Likewise, there are a plurality of membrane sections 30a extending between the various frame sections 46a–50a provided by the interior skeletal frame 28a. However, while the interior membrane sections 30a are also placed in tension, the pressure is exerted against the membrane sections 30a from the interior of the container 10 thus causing the membrane sections 30a to curve outwardly toward their corresponding outer membrane sections 30.

It is necessary to provide interconnecting support members between the outer and inner skeletal frames 28 and 28a. However, these interconnecting supports should be made in a manner to minimize the heat conductive path made by such interconnecting structures. This can be done in three ways. First, the interconnecting structure should be made of a material which has low heat conductivity. Second, the structure should be arranged so that its conductive path is as long as possible. Third, the interconnecting structures should have a cross-sectional area along the heat conductive path to be as small as possible. Further, it should be recognized that while each of the skeletal structures 28 and 28a are subjected to very high loads due to the pressures exerted by the ambient atmosphere and the atmosphere or liquid contained within the container 10, the interconnecting structure between the frames 28 and 28a need only be strong enough to support the weight of the inner structure 24 plus the contained material, and also to withstand any impact loads to which the container 10 might be subjected.

The interconnecting elements are shown only schematically herein, and these are simply given the numerical designation 70, it being understood that the interconnecting structure could be structural components already known in the prior art. These interconnecting elements 70 are located at spaced locations along the length of the various pairs of adjacent beams 40–40a, 42–42a and 44–44a. Since the opposed side beams are subjected to bending moments which tend to move the beams together, the elements 70 tend to cancel these bending moments out.

In the particular configuration as shown herein, the upper and lower longitudinal beams 32 and 34 are substantially identical, and these comprise a pair of plates 72 which meet at a right angle corner 74, with the opposite ends of the plates curving inwardly, as at 76. Reinforcing webs 78 can be provided. The membrane sections 30 can be joined to the beams 32 and 34 by use of conventional bonding techniques, and the edges 52 of the membrane sections 30 can be joined to the beams 34 or 34 at the location of the curve 76 to minimize any localized stresses.

It is to be understood that outer and inner floor and/or wall structures can be provided for the container 10. Such an inner structure is shown at 79 in FIG. 3. Also suitable pressure seals 81 are provided between the beams 38 and 38a.

The cover 20 is made incorporating the same structural principles as those of the outer and inner structures 22 and 24 of the main container 10. As shown herein, the cover 20 has an outer skeletal frame 82 of a square configuration supporting a membrane section 84 which, as described previously, is loaded in tension, so as to have a generally concave configuration. There is an inner frame 86 also having a membrane section 88. The cover member 20 and the forward edge portion of the container 10 are formed with suitable seals which are or may be conventional in the art. Accordingly, this seal structure is simply indicated somewhat schematically and generally designated 90. Further, when the cover 20 is in place at the end of container 10, suitable fastening devices, such as shown at 92 in FIG. 1 can be provided to hold the cover 20 in place. Pressure seals are provided at 93.

To describe the operation of the present invention, let it be assumed that the container 10 is to be used to ship a product, such as a frozen food product, at very low temperatures (e.g. −80° F.). The product can be brought to the desired low temperature by use of conventional means, such as exposure to a cryogenic fluid, the the product then placed in the container 10. In some instances, a quantity of cryogenic fluid (e.g. liquid nitrogen) can be placed inside the container 10 for extending its low temperature condition, with the evaporated fluid being vented from time to time to prevent an undue buildup of pressure.

As indicated previously, the area 26 between the outer and inner structures 22 and 24 is evacuated, with the result that the outer membrane sections 30 are exposed to ambient pressure (14.7 psi at sea level), while the inner membrane sections 30a can be expected to be subjected to pressures at least as high as ambient atmospheric pressure, and possibly somewhat greater if a cryogenic fluid within the container 10 is evaporating.

Let us turn our attention first to the forces exerted by the outer membrane sections 30 on the outer skeletal frame 28. First, with regard to the upper and lower longitudinal beams 32 and 34, the side membrane sections 30 would exert a force on its related upper longitudinal beam 32 which is parallel to that portion of the curved plane of the membrane at the point where it joins to the beam 32. This force would have an inward component, but the main force component would be directed vertically. In like manner, each of the top membrane sections 30 would be exerting primarily a laterally inward force on the two beams 32. The net force exerted on each of the upper beams 32 would be the resultant of the vertical and lateral forces exerted by the side and upper membrane sections 30, and with the upper and side membrane sections 30 being of substantially the same area, the resultant would be a downward and laterally inward force at about 45° from the horizontal. Similar forces would react on the lower longitudinal beams 34. These forces would be resisted by the intermediate beams 40, 42 and 44, which would be loaded in compression.

The membrane sections 30 would also be placing substantial tension forces on each of the intermediate beams 40, 42 and 44. However, it will be noted that the lateral force components of two adjacent membranes would essentially cancel each other out, so that the intermediate beams 40, 42 and 44 would be resisting primarily only the inwardly directed resultant force component. However, even this inward force component could be substantial. For example, if one of the membrane sections 30 had a height dimension of four feet and a width dimension of three feet, the total inwardly directed force component by ambient pressure at sea level would be approximately 150,000 pounds. This loading would be shared by a pair of adjacent intermediate beams 40, 42 or 43 and the sections of the longitudinal beams 32 and/or 34 extending therebetween. Further as indicated earlier herein, the spacing members 70 provide support between the inner and outer beans 40–44a, 42–42a and 44–44a.

The forces exerted on the four end beams 36 would be rather similar to those exerted on the longitudinal beams 32, in that these end beams 36 would react to the forces exerted by membrane sections 30 positioned at right angles to one another. Thus, the resultant force would be directed inwardly at an angle of about 45° to the planes of each of the adjacent membranes 30.

A second embodiment of the present invention is illustrated in FIGS. 6 and 7. This is simply a smaller container 100 having the overall configuration of a square, rectangular prism. As in the first embodiment, there are outer and inner structures 102 and 104, each made up of a related skeletal frame and membrane sections 106 and 108, respectively. The outer section 106 is made up of twelve beams 110, each extending along a related edge of the outer structure 102, and the inner frame 108 is in like manner made up of a set of twelve beams 112. There are outer and inner membranes 114 and 116, as in the prior embodiment, and these function in substantially the same manner as in the first embodiment. Also, the cover 118 of this second embodiment is or may be identical to or substantially the same as the cover 20 of the first embodiment.

The mode of operation of this second embodiment is substantially as the first embodiment, so no further explanation will given.

As indicated previously, from a standpoint of maximizing the effective storage space within the container 10, relative to the total volume occupied by the container, the deflection of the membranes 30-30a which is related to the curvature) should be kept to a minimum. However, the stress on the membranes 30-30a and the beams supporting these membranes increases as the curvature and deflection of the membranes 30-30a decrease.

Figure 8:
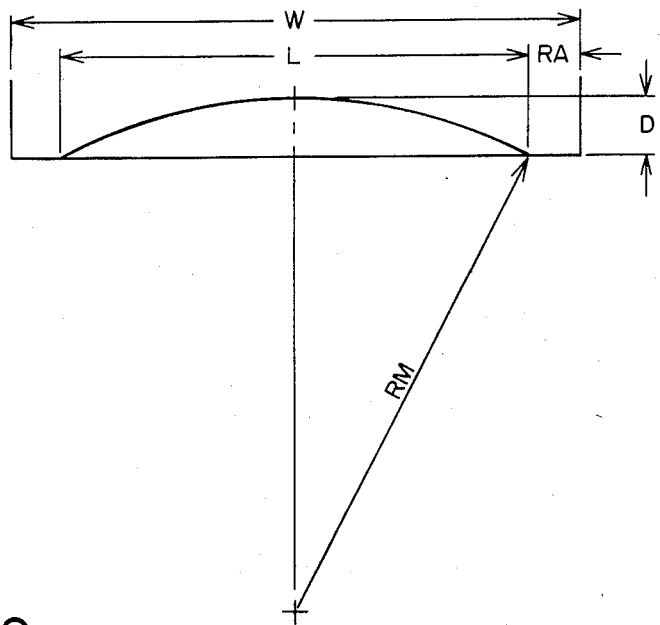
FIG. 8 is a highly schematic view illustrating a curved membrane section mounted to a pair of beams, indicating certain dimensional relationships which are utilized in an analysis of the effects created by varying the deflection of the membrane section.
Figure 9:
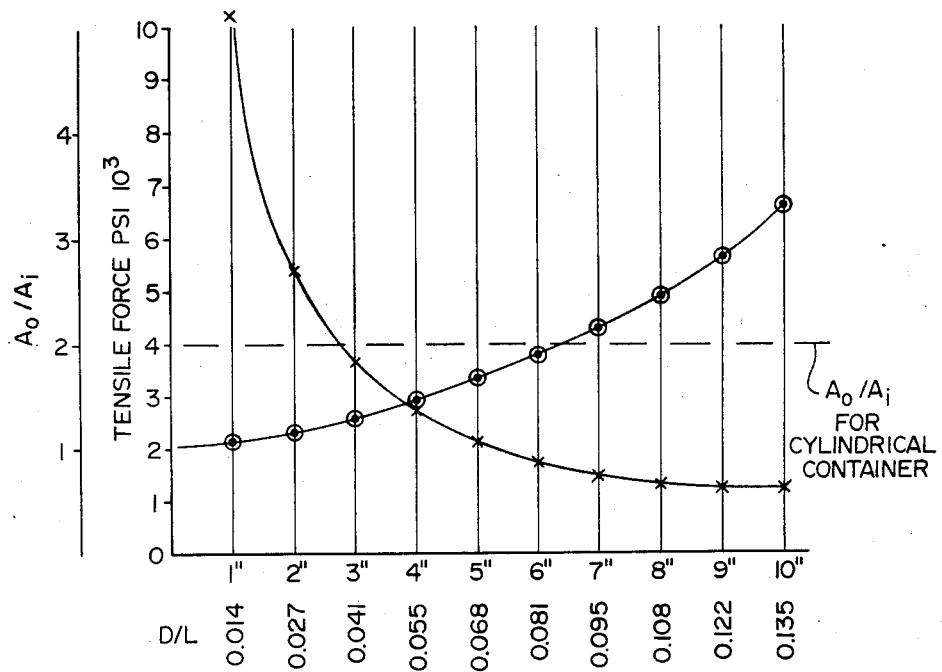
FIG. 9 is a graph illustrating certain relationships resulting from varying the deflection of a membrane section.

To illustrate these relationships, reference is made to FIG. 8 and 9.

FIG. 8 illustrates a somewhat idealized and highly schematic illustration of a configuration of a single outer frame section. The dimension "W" is the total lateral dimension of the container, which is presumed to be 90 inches. It is assumed that the corner beams (such as described previously and indicated at 32 and 34) would occupy a certain amount of space, and it is assumed that the dimension "RA" is equivalent to the corner beam width, which is presumed to be 8 inches for each beam. Thus, the lateral dimension of the curved portion of the membrane (identified at "L" in FIG. 8) is 74 inches. The radius of curvature (indicated at "RM" of the membrane) will vary in accordance with the amount of deflection of the membrane (indicated at "D"). In this idealized example, it is assumed that the deflection "D" varies between 1 to 10 inches. For these deflections, the tensile force resulting from the force of atmospheric pressure on a single one inch width of the membrane has been calculated. A table presenting the various information and the calculations is presented at the end of the text of this specification.

To illustrate these relationships, reference is now made to the graph of FIG. 9. On the horizontal axis, there is presented the deflection "D" in inches, and there is also presented the values of "D/L". On the vertical axis, there is presented the tensile force on each one inch strip of the membrane for the various deflections, and there is also presented the ratio of the outside volume of the container to the inside volume of the container (Ao/Ai). In this idealized example, it is assumed that the thickness dimension of the membranes is zero, and that the spacing between each pair of inner and outer membranes at the maximum point of deflection is also zero. Also, it is assumed that the length of the container is infinite, so that no allowances would have to be made for loss of volume by the presence of an end wall. Also, to simplify calculations, it was assumed that the inside area would be a square area.

As can be seen in FIG. 9, as the deflections become quite small (in the order of one to two inches, which is D/L of 0.014 to 0.027, the force exerted on the membranes (and consequently the total force exerted on the frame structure) increases dramatically. On the other hand, for greater deflections (from 5-10 inches, which is D/L of 0.068 to 0.135), the decrease in the tensile force on the membranes relative to the increase of deflection is substantially less. Also, it can be seen that for very small deflections, the Ao/Ai ratio does not increase significantly. However, as the deflections become greater, this area ratio (which is directly related to the volume ratio of the container for this theoretical container of infinite length) increases at a much greater rate for each increment of deflection.

To draw a comparison between these relationships and a cylindrical vacuum container, let it be assumed that there is a cylindrical vacuum container of infinite length, and that its wall thicknesses are zero, with the space between these walls also being zero. Further, since most cargo is contained in square containers, and since there must be a floor within the cylindrical vacuum container, we shall assume that the containing area is a square fitting within the limits of the circle defined by the cylindrical vacuum container. Further, since these various cylindrical vacuum containers must be contained in a larger shipping container of rectangular configuration (e.g. a trailer or a freight car), we shall consider the effective outside area of the cylindrical container to be equal to a square, where each side of the square is equal to the diameter of a cylindrical container. Under these idealized conditions, it can be seen that the Ao/Ai ratio of this idealized cylindrical container is two. Thus, by plotting this value on the graph of FIG. 9, it can be seen that where the deflection of the container of the example of FIG. 8 is six inches or less, the Ao/Ai ratio of the container of the present invention is less than (and therefore better than) that ratio for the cylindrical container. On the other hand, for a deflection of seven inches or greater, The Ao/Ai ratio of the container of the present invention is greater than (and thus poorer than) the ratio for the cylindrical container).

It is to be emphasized that these relationships are presented in a rather theoretical fashion, primarily to illustrate the relationships. In actually designing the container of the present invention, consideration must be given to the volume occupied by the structural components, tolerances for spacing the components, membrane thickness, etc. Further, the analysis of the cylindrical vacuum container is highly idealized, and no consideration has been given to the structural aspects, particularly the structure of the outside shell of the cylindrical container which must be made sufficiently strong to avoid the buckling loads that would be imparted thereto.

Figure 3:
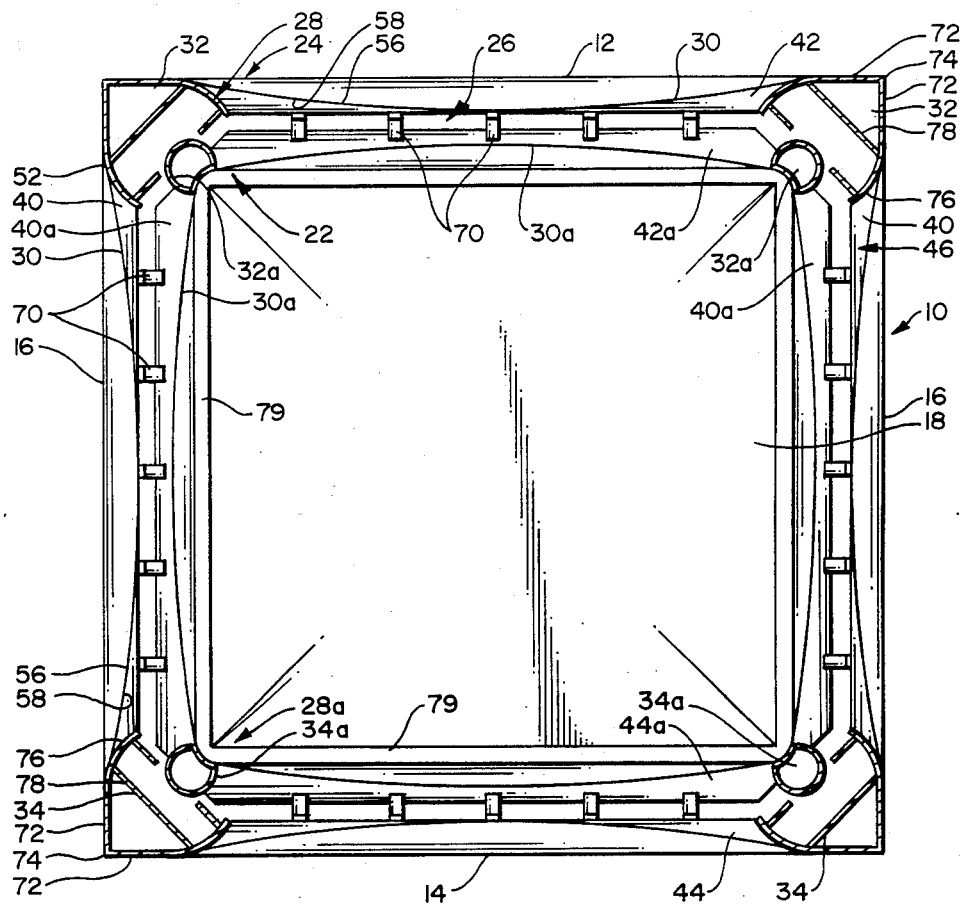
FIG. 3 is a transverse sectional view taken along line 3—3 of FIG. 1.

To discuss other facets of the present invention, it will be noted, with reference to FIG. 3, that the related pair of corner beams 32-32a and 34-34a are aligned with one another at an angle of 45° to the vertical and horizontal axes. It will also be noted that, as discussed previously, the force components exerted on these corner beams 32-32a and 34-34a are also along a line which is approximately 45° to the horizontal and vertical axes. Since the alignment component is at 45°, the spacing between the outermost corner of an outer beam 32 or 34 to the innermost corner point of the inner beam 32a or 34a is at a maximum. Thus, for every unit of the total thickness dimension of a pair of outer and inner panel sections, the maximum spacing from the furtherest surfaces of the beams is approximately 1.4 times greater. This permits the depth of these beams 32-32a and 34-34a to be maximized in the direction where the greatest force is exerted, thus permitting the structure of the beams to be optimized to withstand these forces.

It will also be noted that where each of the membranes 30 or 30a joins to a related beam, at the juncture point, the alignment of the membrane 30 or 30a, relative to the beam, is such that the surface of the beam is tangent to the curvature of the membrane, with the membrane being in a uniform curve. For example, it can be seen that at the juncture point 52 of the membrane 30 to the beam 32 (see FIG. 3) the curved surface portion of the beam 32 is tangent to the membrane 30. The tangent line drawn at the point of contact would make an angle with the general plane occupying the panel section which be equal to the angle $\phi$ as illustrated in FIG. 1A. Thus, substantially no bending moments are imparted to the membranes 30 or 30a at the location where these membranes joint to a related beam.

In FIGS. 10 and 11, there is shown a particular configuration of a cover member, generally designated 120, suitable for use in the present invention. This cover 120 has the same overall configuration of the previously described cover 20, in that it has an outer frame structure made up of four beams 122 interconnected in a square frame, and four inner beams 124 also interconnected to form a square frame. The length of each beam 124 is slightly smaller than that of each beam 122, so that the perimeter of the frame formed by the beams 124 is spaced inwardly from the perimeter of the frame formed by the outer beams 122. As in the prior embodiments, there is an outer membrane 126 stretching between the beams 122, and an inner membrane 128 stretching between the inner beams 124, with the space between the membranes 126 and 128 being evacuated.

The end structure of the container 10 comprises, as in the earlier embodiment, four outer beams 130 and four inner beams 132, with each set of four beams making up a square frame section. The structure and function of these beams 130 and 132 are substantially the same as in the previous embodiments. However, the outer beams 130 have a forward extension so as to form an outer circumferential structure 134 having a square configuration and generally surrounding the cover 120 when the cover 120 is in its closed position.

The cover 120 is hinge mounted at 136 to the structure 134, and the cover 120 has a pair of plate-like mounting members 138 extending from the hinge locations 136. At about the midlength of the cover 120, these mounting members 138 are provided with intermediate hinges 140, the purpose of these hinges 140 to enable the cover 120 to conform more closely to the end contours of the end portion of the container 10.

At spaced locations around the periphery of the cover 120, there are a number of locking levers or dogs 142, each having a main lever portion 144 pivotally mounted to the cover at 146. Each lever or dog 142 also has a locking finger 148 which fits into a related slot in the perimeter structure 134 so as to lock the cover in place.

Each lever 142 is arranged so that it acts through a pair of cams 150 having matching slanted cam surfaces. Each pair of cams 150 is arranged so that as the lever 142 is moved toward its locking position, the pair of cams pushes against a related main compression spring 152 which in turn presses against the main structure of the cover 120 to urge it into tight engagement with the end of the container 10. Each compression spring 152 can be mounted in a related cylindrical housing 154.

A significant feature of the embodiment shown in FIGS. 10 and 11 is the manner in which a seal is created between the cover 120 and the container 10. there is a first seal 156 positioned between the opposed faces of the beams 124 of the cover and the beams 132 of the container. However, there is the problem that when the container 10 is filled with very cold product, the inner frame structure is at a temperature quite close to that of the contained product. On the other hand, the outer frame structure is at a temperature quite close to ambient atmosphere. Thus, the inner frame structure tends to contract relative to the outer frame structure, thus tending to move the inner beams 132 away from the beams 124, thus diminishing the effectiveness of the seal 156.

To alleviate this situation, there is provided a second peripheral seal 158 mounted to the cover 120 and positioned between the outside surface of the beam 124 and the inwardly facing surface of a rear portion of the structure 134. This seal 158 is urged rearwardly into engagement with the forwardly facing edge surfaces of the outer beams 130 by means of a number of second compression springs 160. These compression springs 160 can be placed at spaced locations around the periphery of the cover 120. Thus, the seal 158 is able to engage the front surface of the outer beams 130 and the outwardly facing lateral surface of the beams 124 to effect the appropriate seal.

As in the first embodiment, suitable pressure seals are provided, these being indicated at 162.

While the present invention has been described primarily with respect to containing refrigerated product, it is to be understood that it also could be used to maintain certain product at higher than ambient temperature. For example, with freezing ambient temperatures, the present invention could be used to prevent the contained product from freezing. Also, with the container being fluid tight, the containing area can be filled with a gaseous medium more conducive to preserving the product.

Attached is page 28a, the table of the calculations made relative to FIGS. 8 and 9.

It is to be understood that various modifications could be made to the present invention without departing from the basic teachings thereof.

| TABLE OF AREA RATIOS TO DEFLECTIONS OF MEMBRANE | | | | | | | | | | | |
| --- | --- | --- | --- | --- | --- | --- | --- | --- | --- | --- | --- |
| D | 1 | 1 | 2 | 3 | 4 | 5 | 6 | 7 | 8 | 9 | 10 | 6.592 |
| L | 74 | 74 | 74 | 74 | 74 | 74 | 74 | 74 | 74 | 74 | 74 |
| P | 15 | 15 | 15 | 15 | 15 | 15 | 15 | 15 | 15 | 15 | 15 |

-continued

TABLE OF AREA RATIOS TO DEFLECTIONS OF MEMBRANE

| RA | 8 | 8 | 8 | 8 | 8 | 8 | 8 | 8 | 8 | 8 | 8 | 8 |
|---|---|---|---|---|---|---|---|---|---|---|---|---|
| THETA (@ASIN(L/(2*RM)))*180/@PI | | 3.096 | 6.188 | 9.271 | 12.340 | 15.392 | 18.422 | 21.426 | 24.401 | 27.343 | 30.248 | 20.204 |
| RM ((4*D^2)+L^2)/(8*D) | | 685 | 343 | 230 | 173 | 139 | 117 | 101 | 90 | 81 | 73 | 107 |
| F +P*RM | | 10275 | 5149 | 3445 | 2597 | 2091 | 1756 | 1519 | 1343 | 1208 | 1102 | 1607 |
| W +L=2*RA | | 90 | 90 | 90 | 90 | 90 | 90 | 90 | 90 | 90 | 90 | 90 |
| AO +W^2 | | 8100 | 8100 | 8100 | 8100 | 8100 | 8100 | 8100 | 8100 | 8100 | 8100 | 8100 |
| AI (W-4*D)^2 | | 7396 | 6724 | 6084 | 5476 | 4900 | 4356 | 3844 | 3364 | 2916 | 2500 | 4049 |
| AO/AI +AO/AI | | 1.095 | 1.205 | 1.331 | 1.479 | 1.653 | 1.860 | 2.107 | 2.408 | 2.778 | 3.240 | 2.000 |
| DL +D/L | | 0.014 | 0.027 | 0.041 | 0.054 | 0.068 | 0.081 | 0.095 | 0.108 | 0.122 | 0.135 | 0.089 |
| CIRCLE | | | | | | | | | | | | |
| AOC/AIC +AOC/AIC | 1.571 | | | | | | | | | | | |
| AO/AIC +AO/AIC | 2 | | | | | | | | | | | |
| AOC @PI*(W/2) 2 | 6361.72 | | | | | | | | | | | |
| AIC (W*@COS(@PI/4))^2 | 4050 | | | | | | | | | | | |

DEFINITIONS

| | |
|---|---|
| D | DEFLECTION OF MEMBRANE—INCHES |
| L | LENGTH OF ARC MEMBRANE—INCHES |
| P | PRESSURE—PSI |
| RA | CORNER BEAM WIDTH—INCHES |
| THETA | ANGLE OF INCIDENCE |
| RM | RADIUS OF MEMBRANE CURVATURE—INCHES |
| F | TENSILE FORCE—POUNDS PER INCH OF WIDTH |
| W | OVERALL WIDTH—INCHES |
| AO | OUTSIDE AREA—SQ IN |
| AI | INSIDE AREA—SQ IN |
| AO/AI | RATIO |
| D/L | RATIO |
| AOC | OUTSIDE AREA CIRCLE—SQ IN |
| AIC | INSIDE AREA CIRCLE—SQ IN |

I claim:

1. A vacuum insulated container, comprising:
   a. a fluid tight outer containing structure having first wall means adapted to be exposed to ambient pressure;
   b. a fluid tight inner containing structure having a second inner wall means spaced inwardly from said first wall means and defining a product containing area;
   c. said first and second wall means defining therebetween a substantially evacuated insulating area to insulate said containing area from ambient heat transfer;
   d. said outer containing structure comprising a plurality of wall sections, each of said wall sections comprising:
      1. a perimeter frame defining a wall section area;
      2. a generally planar membrane section extending across said wall section area and having a main central portion and a perimeter portion attached to said perimeter frame;
      3. the main central portion of the membrane section having a configuration, relative to said perimeter frame, of an inwardly curved plane, such that ambient pressure acting against an outer surface of said membrane section causes said membrane section to react substantially entirely in tension to withstand said ambient pressure.

2. The container as recited in claim 1, wherein said outer containing structure comprises at least four longitudinally extending corner beams, each of which is connected to at least two related membrane sections, each of which related membrane sections has a related locating plane coincident with the perimeter portion of that membrane section, the locating planes of the two related membrane sections that join to their said related beam forming an interior angle of less than 180°, whereby said two related membrane sections, each acting in tension relative to their said related beam, exert a resultant force on their said related beam inwardly along a force component line being directed inwardly between said two locating planes.

3. The container as recited in claim 2, wherein each related pair of said corner beams is connected to one another by cross beams, extending generally transversely between said related pair of corner beams, each of said coner beams reacting to resist compression loads existing between its related pair of corner beams, each adjacent pair of said cross beams forming with related portions of their said related corner beams a related one of said perimeter frames.

4. The container as recited in claim 1, wherein said inner containing structure comprises a plurality of second wall sections, each of said second wall sections comprising:
   a. a second perimeter frame defining a second wall section area;
   b. a generally planar second membrane section extending across said second wall section area and having a main central portion and a perimeter portion attached to said second perimeter frame;
   c. the main central portion of the second membrane section having a configuration, relative to said perimeter frame, of an outwardly curved plane in a manner that pressure within said container acting against an inner surface of said membrane section causes said membrane section to react substantially entirely in tension to withstand said pressure inside the container.

5. The container as recited in claim 1, wherein each of said membrane sections has a related locating plane coincident with the perimeter portion of that membrane section, each membrane section having a width dimension, and having a deflection distance which is that distance between the locating plane and a maximum point of deflection of the main central portion of the membrane section, said membrane section having a deflection over width value which is equal to the deflection dimension divided by the width, said deflection over width value being at least as great as about 0.02.

6. The container as recited in claim 1, wherein each of said membrane sections has a related locating plane coincident with the perimeter portion of that membrane section, each membrane section having a width dimension, and having a deflection distance which is that distance between the locating plane and a maximum point of deflection of the main central portion of the membrane section, said membrane section having a deflection over width value which is equal to the deflection dimension divided by the width, said deflection over width value being at least as great as about 0.04.

7. The container as recited in claim 1, wherein each of said membrane sections has a related locating plane coincident with the perimeter portion of that membrane section, each membrane section having a width dimension, and having a deflection distance which is that distance between the locating plane and a maximum point of deflection of the main central portion of the membrane section, said membrane section having a deflection over width value which is equal to the deflection dimension divided by the width, said deflection over width value being no greater than 0.1.

8. The container as recited in claim 1, wherein each of said membrane sections has a related locating plane coincident with the perimeter portion of that membrane section, each membrane section having a width dimension, and having a deflection distance which is that distance between the locating plane and a maximum point of deflection of the main central portion of the membrane section, said membrane section having a deflection over width value which is equal to the deflection dimension divided by the width, said deflection over width value being no greater than 0.07.

9. A vacuum insulated container, having a longitudinal axis, a vertical axis, and a transverse axis:
   a. a fluid tight outer containing structure having first outer wall means adapted to be exposed to ambient pressure;
   b. a fluid tight inner containing structure having a second inner wall means spaced intwardly from said first wall means and defining a product containing area;
   c. said first and second wall means defining therebetween a substantially evacuated insulating area to insulate said containing area from ambient heat transfer;
   d. said outer containing structure comprising a first support frame, said first support frame comprising:
      1. a plurality of first longitudinally extending corner beams located at edge corner locations of said container;
      2. a plurality of first cross beams extending transversely between adjacent pairs of said first corner beams, with each adjacent pair of first cross beams forming with portions of their said related corner beams a first perimeter frame section;
   e. said outer container structure further comprising a first membrane means mounted to said first frame structure, each first perimeter frame section defining a first related wall section area, with said membrane means defining a plurality of generally planar first membrane sections, each extending across a related one of said first wall section areas, with each first membrane section having a main central portion and a perimeter portion attaching to its said related first perimeter frame, the main central portion of each first membrane section having a configuration, relative to its said related perimeter frame, of an inwardly curved plane in a manner that ambient pressure acting against an outer surface of said first membrane section causes said first membrane section to react substantially entirely in tension to withstand said ambient pressure;
   f. said inner containing structure comprising a second support frame, said second support frame comprising:
      1. a plurality of second longitudinally extending corner beams located at edge corner locations of said container;
      2. a plurality of second cross beams extending transversely between adjacent pairs of said first corner beams, with each adjacent pair of second cross beams forming with portions of their said related corner beams a second perimeter frame section;
   g. said inner container structure further comprising a second membrane means mounted to said second frame structure, each second perimeter frame section defining a second related wall section area, with said membrane means defining a plurality of generally planar second membrane sections, each extending across a related one of said second wall section areas, with each second membrane section having a main central portion and a perimeter portion attaching to its said related second perimeter frame, the main central portion of each second membrane section having a configuration, relative to its said related perimeter frame, of an outwardly curved plane in a manner that pressure within said container acting against an inner surface of said second membrane section causes said second membrane section to react substantially entirely in tension to withstand said ambient pressure.

10. The container as recited in claim 9, wherein each of said second corner beams is positioned adjacent to and inwardly of a related one of said first corner beams.

11. The container as recited in claim 10, wherein each of said second cross beams is positioned adjacent to and inwardly of a related one of said first cross beams.

12. The container as recited in claim 11, wherein said container has an overall configuration of a rectangular prism, with said first corner beams comprising at least two first upper corner beams and two first lower corner beams, said second corner beams comprising at least two second upper corner beams and two second lower corner beams, each of said second upper corner beams being spaced downwardly from and laterally inwardly from a related one of said first upper corner beams, each of said second lower corner beams being spaced upwardly from and laterally inwardly from a related one of the first lower corner beams.

13. The container as recited in claim 12, wherein said container further comprises frame interconnecting means interconnecting said first and second frames so as to maintain said first and second frames spaced from one another.

14. The container as recited in claim 13, wherein said interconnecting means are positioned, at least partially, between adjacent pairs of first and second cross beams, whereby tension loads imparted by related ones of said membrane sections acting on said first and second cross beams is reacted in compression between said interconnecting means.

15. The container as recited in claim 9, wherein said container further comprises frame interconnecting means interconnecting said first and second frames so as to maintain said first and second frames spaced from one another.

16. The container as recited in claim 15, wherein said interconnecting means are positioned, at least partially, between adjacent pairs of first and second cross beams, whereby tension loads imparted by related ones of said membrane sections acting on said first and second cross beams is reacted in compression between said interconnecting means.

17. The container as recited in claim 9, wherein each of said membrane sections has a related locating plane coincident with the perimeter portion of that membrane section, each membrane section having a width dimension, and having a deflection distance which is that distance between the locating plane and a maximum point of deflection of the main central portion of the membrane section, said membrane section having a deflection over width value which is equal to the deflection dimension divided by the width, said deflection over width value being at least as great as about 0.02.

18. The container as recited in claim 9, wherein each of said membrane sections has a related locating plane coincident with the perimeter portion of that membrane section, each membrane section having a width dimension, and having a deflection distance which is that distance between the locating plane and a maximum point of deflection of the main central portion of the membrane section, said membrane section having a deflection over width value which is equal to the deflection dimension divided by the width, said deflection over width value being at least as great as about 0.04.

19. The container as recited in claim 9, wherein each of said membrane sections has a related locating plane coincident with the perimeter portion of that membrane section, each membrane section having a width dimension, and having a deflection distance which is that distance between the locating plane and a maximum point of deflection of the main central portion of the membrane section, said membrane section having a deflection over width value which is equal to the deflection dimension divided by the width, said deflection over width value being no greater than 0.1.

20. The container as recited in claim 9, wherein each of said membrane sections has a related locating plane coincident with the perimeter portion of that membrane section, each membrane section having a width dimension, and having a deflection distance which is that distance between the locating plane and a maximum point of deflection of the main central portion of the membrane section. Said membrane section having a deflection over width value which is equal to the deflection dimension divided by the width, said deflection over width value being no greater than 0.07.

21. An insulating structure, comprising:
  a. a fluid tight outer wall structure;
  b. a fluid tight inner wall structure;
  c. said outer and inner wall structures defining therebetween a substantially evacuated insulating area to insulate said containing area from ambient heat transfer;
  d. said outer wall structure comprising:
    1. a first perimeter frame comprising a plurality of interconnected first beams located at edge locations of said first frame;
    2. a planar first membrane section, extending across said first perimeter frame, with said first membrane section having a main central portion and a perimeter portion attaching to said first perimeter frame, the main central portion of said first membrane section having a configuration, relative to its said related perimeter frame, of an inwardly curved plane in a manner that pressure acting against an outer surface of said first membrane section causes said first membrane section to react substantially entirely in tension to withstand said ambient pressure;
  e. said inner containing structure comprising:
    1. a second support frame comprising a plurality of interconnecting second beams located at edge locations of said second frame;
    2. a planar second membrane section extending across said second perimeter frame, with said second membrane section having a main central portion and a perimeter portion attaching to its said related second perimeter frame, the main central portion of said second membrane section having a configuration, relative to its said related perimeter frame, of an outwardly curved plane in a manner that pressure acting against an inner surface of said second membrane section causes said second membrane section to react substantially entirely in tension to withstand said ambient pressure.

22. The insulating structure as recited in claim 21, wherein said insulating structure is a cover member for a container, where the container comprises a first fluid tight outer containing structure having first wall means adapted to be exposed to ambient atmosphere, and a fluid tight inner containing structure having a second inner wall means spaced inwardly from said first wall means and defining a product containing area, said container having an end opening defined by a perimeter edge portion of said container, said perimeter edge portion having a forwardly facing perimeter surface;
  said cover member having a forward surface and a rear surface, said cover member further comprising:
    a. a perimeter seal mounted to said cover member and positioned around a laterally outwardly facing perimeter surface of said cover member so as to be in sealing relationship with said cover member;
    b. spring means mounted to said cover member and arranged to engage said seal and urge said seal against said forwardly facing perimeter surface of the container.

23. The insulating structure as recited in claim 22, wherein said cover member further comprises second compression spring means mounted to a perimeter portion of said cover, securing handle means mounted to the perimeter portion of the cover and operable to engage the perimeter portion of the container in interlocking relationship, said handle means operatively engaging said compression spring means in a manner that manipulating said handle to its locking position causes said compression spring means to urge said cover member into contact with the perimeter portion of the container.

24. The insulating structure as recited in claim 23, wherein there is second seal means mounted to said cover at a perimeter portion of the rearwardly facing surface of the cover, said second seal means being in sealing engagement with the inner containing structure of the container.

* * * * *